United States Patent
Jain et al.

(10) Patent No.: US 11,734,136 B1
(45) Date of Patent: Aug. 22, 2023

(54) QUICK DISASTER RECOVERY IN DISTRIBUTED COMPUTING ENVIRONMENT

(71) Applicant: INTERNATIONAL BUSINESS MACHINES CORPORATION, Armonk, NY (US)

(72) Inventors: Rakesh Jain, San Jose, CA (US); Sandeep Gopisetty, Morgan Hill, CA (US); Divyesh Jadav, San Jose, CA (US); Eric Kevin Butler, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/650,731

(22) Filed: Feb. 11, 2022

(51) Int. Cl.
*G06F 11/00* (2006.01)
*G06F 11/20* (2006.01)

(52) U.S. Cl.
CPC ........ *G06F 11/203* (2013.01); *G06F 11/2025* (2013.01); *G06F 2201/85* (2013.01)

(58) Field of Classification Search
CPC .......................................... G06F 11/202–2051
See application file for complete search history.

(56) References Cited

U.S. PATENT DOCUMENTS

| | | | |
|---|---|---|---|
| 7,093,086 B1 | 8/2006 | Van Rietschote | |
| 8,161,321 B2 | 4/2012 | Zheng | |
| 9,176,829 B2 | 11/2015 | Jain | |
| 9,483,359 B2 | 11/2016 | Montulli | |
| 10,114,834 B2 | 10/2018 | Yin | |
| 10,169,174 B2 | 1/2019 | Jain | |
| 10,528,433 B2 | 1/2020 | Protasov | |
| 10,990,485 B2 | 4/2021 | Karasev | |
| 2014/0143401 A1* | 5/2014 | Carlen | G06F 11/2043 709/223 |
| 2018/0285202 A1 | 10/2018 | Bhagi | |

(Continued)

FOREIGN PATENT DOCUMENTS

| | | |
|---|---|---|
| CN | 111966467 A | 11/2020 |
| CN | 112099989 A | 12/2020 |

OTHER PUBLICATIONS

Github, "Container-Storage-Interface," Github, [accessed Jan. 11, 2021], 3 pgs., Retrieved from the Internet: <https://github.com/container-storage-interface/spec>.

(Continued)

*Primary Examiner* — Michael Maskulinski
(74) *Attorney, Agent, or Firm* — Andre L. Adkins (57) ABSTRACT

A method, computer system, and a computer program for quick disaster recovery of cloud-native environments is provided. The present invention may include replicating at a secondary server site software executing in a cloud-native environment on a primary server site. The present invention may also include detecting a failure associated with the software executing in the cloud-native environment. The present invention may then include whether the detected failure is causing down time for the software executing in the cloud environment. The present invention may further include deploying the replicated software on the secondary server site in response to determining that the detected failure is causing down time.

20 Claims, 8 Drawing Sheets

(56) References Cited

U.S. PATENT DOCUMENTS

2022/0229605 A1* 7/2022 Degwekar ............. G06F 3/0604
2022/0391294 A1* 12/2022 Kulkarni ................ G06F 9/54

OTHER PUBLICATIONS

Kubernetes, "Persistent Volumes," Kubernetes, [accessed Jan. 11, 2022], 15 pgs., Retrieved from the Internet: <https://kubernetes.io/docs/concepts/storage/persistent-volumes/>.
Mell et al., "The NIST Definition of Cloud Computing", National Institute of Standards and Technology, Special Publication 800-145, Sep. 2011, pp. 1-7.

* cited by examiner

QUICK DISASTER RECOVERY IN DISTRIBUTED COMPUTING ENVIRONMENT

BACKGROUND

The present invention relates generally to the network backup systems, and more particularly disaster recovery of computing resources available via the cloud.

Site replication seeks to provide a copy of a site in a new hosting environment to reduce issues resulting from unavailability of the original site. Site replication should allow the backup site to take over and run the application if the original site becomes unavailable due to various issues such as a natural disaster. Site downtime may nevertheless occur due to a need to construct the topology of the original site on the replicated site. The length of the downtime along with inefficiencies of the replicated site may be exacerbated by improper configuration of components of the replicated site. If the configuration is not proper then deployment of the replicated site cannot be constant.

SUMMARY

According to one exemplary embodiment, a computer-implemented method for disaster recovery is provided. A computer replicates at a secondary server site software executing in a cloud-native environment on a primary server site. The computer detects a failure associated with the software executing in the cloud-native environment. The computer determines whether the detected failure is causing down time for the software executing in the cloud-native environment. The computer deploys the replicated software on the secondary server site in response to the determination that the detected failure is causing down time. A computer system, a computer program product, and a disaster recovery system corresponding to the above method are also disclosed herein.

With this embodiment, replication of the secondary server site including a supporting topology is accomplished via a storage driver configured to connect to a replication meta-store and obtain mappings of pods and an associated storage system by identifying replicated storage volumes bound to storage requests.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for quick disaster recovery of the cloud-native environments. Container orchestration technologies have enabled systems to implement containerized software for distributed services, microservices, and/or applications executing or residing in cloud environments. The deployment and scaling of these services, microservices, and/or applications are accomplished by containers configured to virtualize operating system functionality, in which containers within a network are managed on a container orchestration platform. The containers are controlled over a plurality of clusters which serve as an accumulation of computing resources for the platform to operate workloads. The containers are configured to store data by utilizing storage systems allowing multiple sites to replicate and host data associated with the containers. For example, data from a primary site including the containers can be replicated to a secondary site despite the sites being in distinct geographic locations. However, traditionally one or more drivers of the system are configured to allocate storage volumes of the primary site to the secondary site prior to deployment of the containers, which requires creation of an additional storage volume. Due to the lack of existing topology of the secondary site prior to deployment, a failure on the primary site results in a significant downtime needed to construct the container topology on the secondary site before the application running on the primary site is available again. As such, the present embodiments have the capacity to improve the field of network backup systems by reducing recovery time objective (RTO) of cloud-native applications in case of disaster by automatically deploying applications in a manner that provisions and manages storage volumes through a container orchestrator platform (COP). In addition, the present embodiments improve the functioning of computing systems by reducing the amount of computing resources required for data replication via mapping storage volume requests and storing the mappings in a replication meta-store for utilization by the COP which prevents the secondary site from having to create a new storage volume for volume requests.

As described herein, a storage volume object (SVO) is a fraction of storage of the plurality of clusters provisioned using storage classes, wherein the lifecycle of the SVO is self-determined. A volume request (VR) is a request for storage configured to consume SVO resources.

Figure 1:
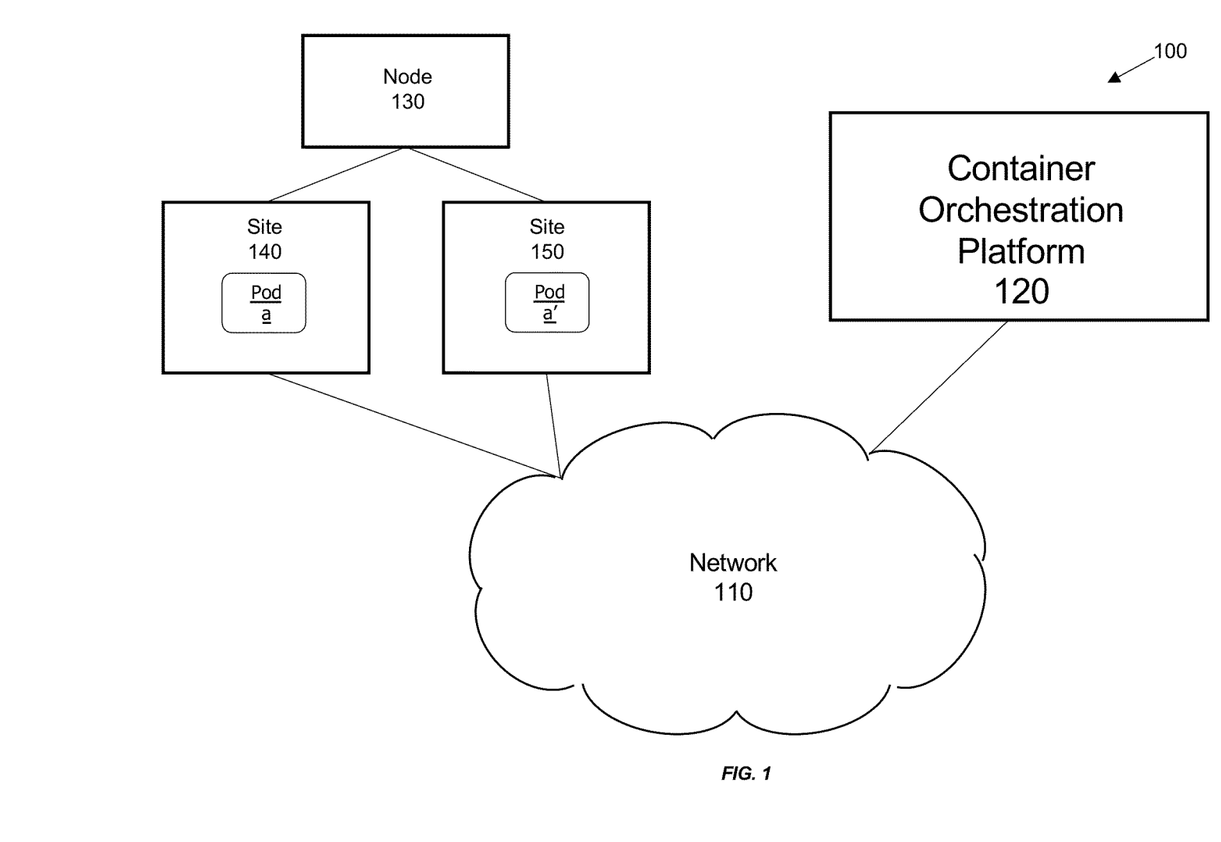
FIG. 1 illustrates a functional block diagram illustrating a container network environment according to at least one embodiment.

Referring now to FIG. 1, a container network environment 100 is depicted according to an exemplary embodiment. In some embodiments, environment 100 includes a network 110, a container orchestration platform (COP) 120 configured to manage a master node 130 associated with a primary server site 140 and a secondary server site 150, each of primary server site 140 and secondary server site 150 including at least a server configured to be communicatively coupled to COP 120 and master node 130 over network 110. Network 110 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. In some embodiments, network 110 is configured as public cloud computing environments, which can be providers known as public cloud services providers, e.g., IBM® CLOUD® cloud services, AMAZON® WEB SERVICES® (AWS®), or MICROSOFT® AZURE® cloud services. (IBM® and IBM CLOUD are registered trademarks of International Business Machines Corporation. AMAZON®, AMAZON WEB SERVICES® and AWS® are registered trademarks of Amazon.com, Inc. MICROSOFT® and AZURE® are registered trademarks of Microsoft Corporation.) Embodiments herein can be described with reference to differentiated fictitious public computing environment (cloud) providers such as ABC-CLOUD, ACME-CLOUD, MAGIC-CLOUD, and SUPERCONTAINER-CLOUD.

In some embodiments, COP 120 includes at least one of Kubernetes®, Docker Swarm®, OpenShift®, Cloud Foundry®, and Marathon/Mesos®, OpenStack®, VMware®, Amazon ECS®, or any other applicable container orchestration system for automating software deployment, scaling, and management. It should be noted that network 110 may be agnostic to the type of COP 120. In a preferred embodiment, COP 120 manages Kubernetes® (all container orchestration platforms collectively referred to as "pods") which are configured to be applied to management of computing-intensive large scale task applications in network 110. For example, pods may function as groups of containers (e.g., rkt container, runc, OCI, etc.) that share network 110 along with computing resources of environment 100 for the purpose of hosting one or more application instances. In an alternative embodiment, COP 120 may manage a plurality of virtual machine pods, namespace pods, or any other applicable type of deployable objects known to those of ordinary skill in the art. As provided above, services, microservices, and/or applications are configured to run in the pods. In some embodiments, master node 130 may be a plurality of nodes (e.g., master nodes, worker nodes, etc.) representing a cluster of the plurality of clusters interconnected over network 110. The plurality of nodes may manage the pods as illustrated in FIG. 1. In some embodiments, master node 130 is a Kubernetes® master configured to deploy application instances across the plurality of nodes and functions as a scheduler designed to assign the plurality of nodes based on various data such as, but not limited to, resources and policy constraints within COP 120. It should be noted that secondary site 150 is a replica (target site) of primary site 140 (source site) in which sites 140 and 150 are configured to indicate two separate locations (e.g., geography-based, system-based, network-based, etc.). In some embodiments, secondary site 150 is a replication of a plurality of other sites including primary site 140. It should be appreciated that FIG. 1 provides only an illustration of one implementation and does not imply any limitations with regard to the environments in which different embodiments may be implemented. Many modifications to the depicted environments may be made based on design and implementation requirements.

Figure 2A:
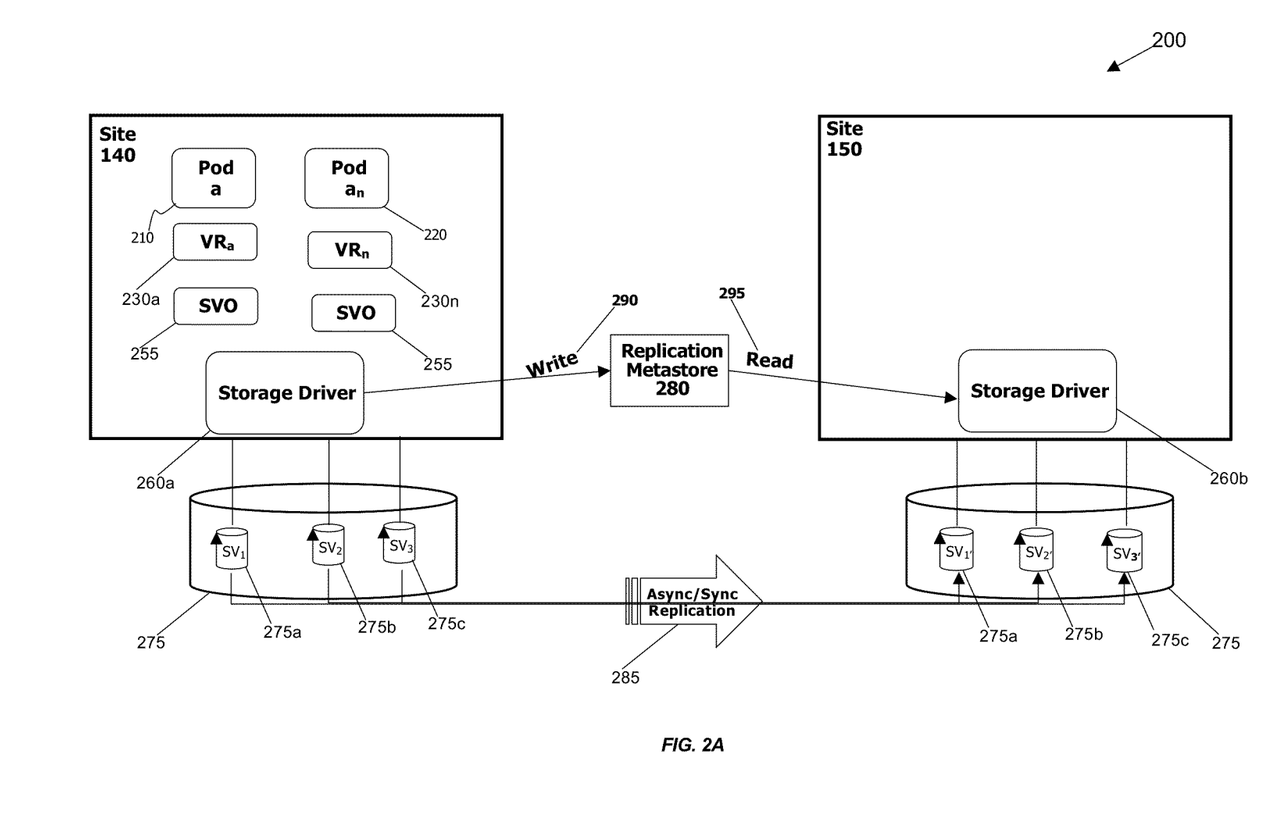
FIGS. 2A-B illustrate a schematic depiction of a generation of a network topology, upon failover, on which the invention may be implemented according to at least one embodiment.
Figure 2B:
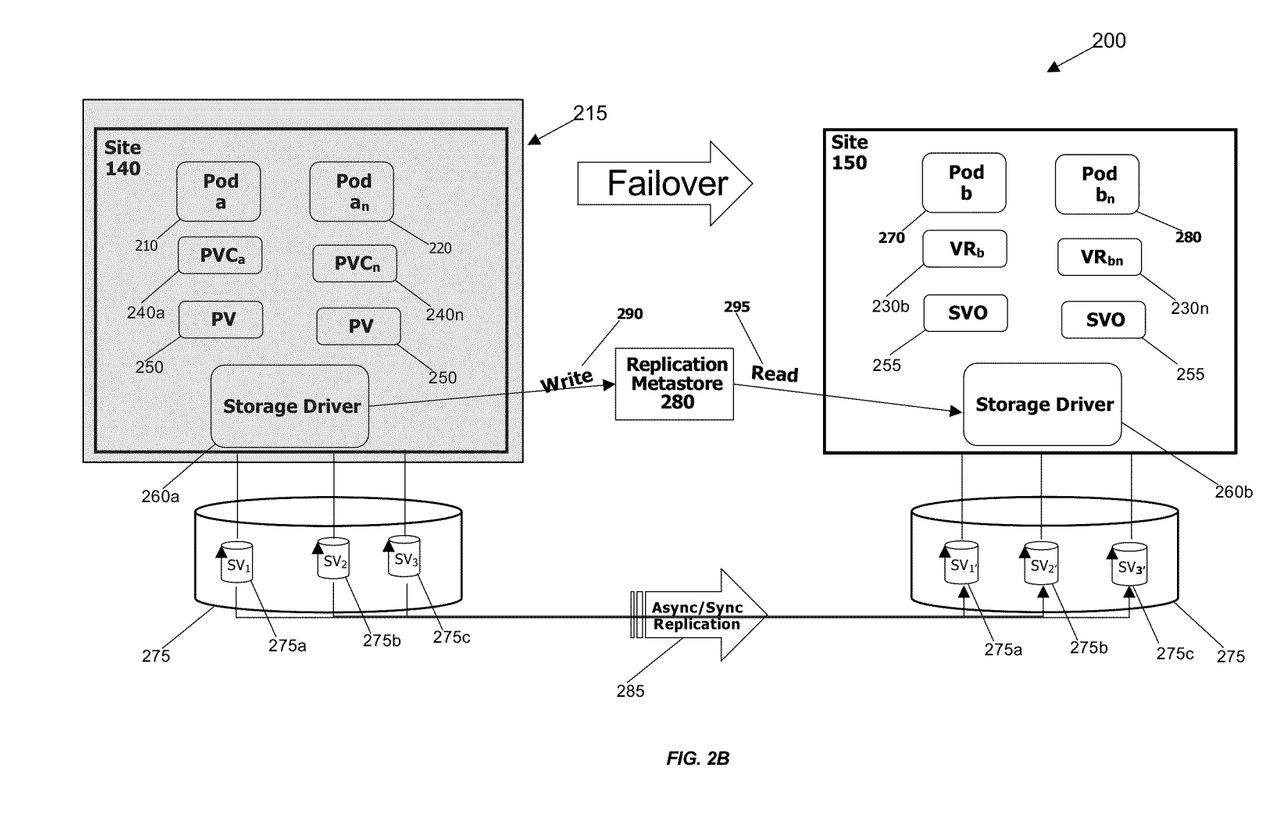

Referring now to FIGS. 2A-B, a network topology 200 of master node 130 is depicted according to an exemplary embodiment. In some embodiments, primary site 140 includes a pod a 210 and a pod $a_n$ 220 configured to run on master node 130 based on at least one cluster of the plurality of clusters. Pod $a_n$ 220 is depicted in order to show that master node 130 may be associated with multiple pods operating on a site. COP 120 schedules pods 210-220 across the applicable node within a particular cluster of the plurality of clusters while taking into account the available resources on each node of the plurality of nodes. For example, FIG. 2B depicts an exemplary construction of pod b 270 and pod $b_n$ 280 on secondary site 150 derived from pod a 210 and a pod $a_n$ 220 upon a failover 215 occurring on primary site 140. In some embodiments, primary site 140 may further include a volume request (VR) 230b and a VRn 230n configured to function as entities that allows pods 210 and 220 to consume storage. In some embodiments, VR is a persistent volume claim derived from persistent volume (PV) 250. Primary site 140 may further include a storage system 275 including a plurality of storage volumes (SV) 275a-n. In some embodiments, each SVa-c of plurality of storage volumes 275 may include multiple units of digital data space accumulated across various storage devices distributed among multiple devices/nodes. Storage system 275 is configured to be failure-tolerant and communicate with one or more servers associated with network 110 in order to ascertain resources and any other applicable data of network 110 and its components.

As described above, each of pods$_{a-n}$ 210-220 may run a respective service, microservice, and/or application at primary site 140; however, the running applications may require a storage volume object (SVO) 255 configured to be provisioned by COP 120 and/or dynamically provisioned via one or more storage classes associated with COP 120. In some embodiments, a storage volume object is persistent volume storage. In some embodiments, a storage policy of one or more components of COP 120 may define storage classes based on the actual performance achieved by primary server site 140, secondary server site 150, and/or components of environment 100. For example, VRs can be paired with the SVOs for respective pods by the individuals pods utilizing a storage class object then utilizing the applicable storage class to create the pairing dynamically whenever it is necessary to be utilized. Master node 130 further includes one or more storage drivers 260a & 260b configured to manage and associate storage along with communicate with one or more components of master node 130; subject to the embodiment, storage driver 260a functions as the storage provisioning component of primary server site 140 and storage driver 260b functions as the storage provisioning component of secondary server site 150. Storage drivers 260a & 260b are installed in COP 120 as plugins; however, utilization, configuration, and behavior of storage driver 260a or 260b is based upon which of sites 140 and 150 the storage driver is being used for. For example, if the replication role is intended for secondary site 150 then storage driver 260b creates VR b 230 and VR $b_n$ 230 on secondary site 150 and VR b 230b and VR $b_n$ 230n instruct storage driver 260b to create SVO 255. It should be noted that traditionally the data of secondary site 150 is available; however, the topology for secondary site 150 does not exist because of the lack of information pertaining to significant factors such as availability of resources on each node associated with secondary site 150. In contrast, the embodiments provided herein allow construction of topology 200 in a manner that creates VR b 230b and VR $b_n$ 230n at secondary site 150 which generate SV objects (such as SVO 255 of FIG. 2B) that map to plurality of storage volumes (SV) 275 rather than creating a new SV at secondary site 150. It should be noted that SVO 255 may be a plurality of SVOs in which each SV of the plurality of SVOs may correspond to a particular application and/or component of said application (e.g., application image layers, application instance data, read/write permission, etc.), and VR 220, VRn 235, VR b 230b, and VR $b_n$ 230n are bound to SVO 255, respectively, in order to obtain storage. An essential function of SVO 255 is to perform the mapping to SV 275. SVO 255 may include SV data including but not limited to pointers and/or references to data shared by pods 210-220.

Traditionally for applications running in Kubernetes®, there is a fixed mapping of pods to VR in which each VR maps to only one SVO and each SVO maps to only one SV resulting in a mapping of primary site 140 of pod-VR-SVO-SV. In contrast, storage system 270 allows mappings of plurality of storage volumes 275. In particular, storage system 270 utilizes an asynchronous/synchronous replication mechanism 285 designed and configured to protect and distribute data across the cluster and provide recovery time objectives (RTO) and near-zero recovery point objectives (RPO) by supporting mapping, via storage driver 260, one to one relationships between plurality of SVs 275 ($SV_1$ to $SV_{1'}$, $SV_2$ to $SV_{2'}$, $SV_3$ to $SV_{3'}$). Master node 130 further includes a replication meta-store 280 configured to function as storage space for mappings of the pods and storage system 270. In some embodiments, replication meta-store 280 is configured to manage replica assignments along with monitor actions associated with a plurality of write requests operations 290 (write handling logic) from one or more applications of site 140 and a plurality of read requests/operations 295 (read handling logic) originating from one or more applications of site 140 (collectively referred to as read/write handling logic), in which storage driver 260 is configured to intercept read/write handling logic 290 and 295. Read/write handling logic 290 and 295 is a functional component of storage driver 260, and read/write handling logic 290 and 295 allows reception of read requests generated by storage driver 260, querying of replication meta-store 280 based on the read requests, and retrieval of the applicable data block corresponding to the read requests. It should be noted that storage driver 260 is configured to write one or more data blocks derived from applications running on the pods of site 140 based on one or more queries to replication meta-store 280 for particular data blocks in which the provisioning is for generating the topology of site 150. In some embodiments, each pod is identified by a Universally Unique Identifier (UUID) of primary site 140 or secondary site 150, and primary site 140 may include one or more cluster IDs associated with the plurality of clusters configured to allow secondary site 150, via storage driver 260b, select the appropriate mapping from replication meta-store 280. The purpose of the UUIDs and cluster IDs are to enable the storage drivers to identify particular instances of storage volume request mappings. For example, the configuration of storage driver 260b includes the cluster ID of a cluster of primary site 140 meaning storage driver 260b only deals with replication of data onto secondary site 150 specific to the cluster. Storage and retrieval of mappings will be discussed in greater detail in reference to FIG. 4.

Figure 3:
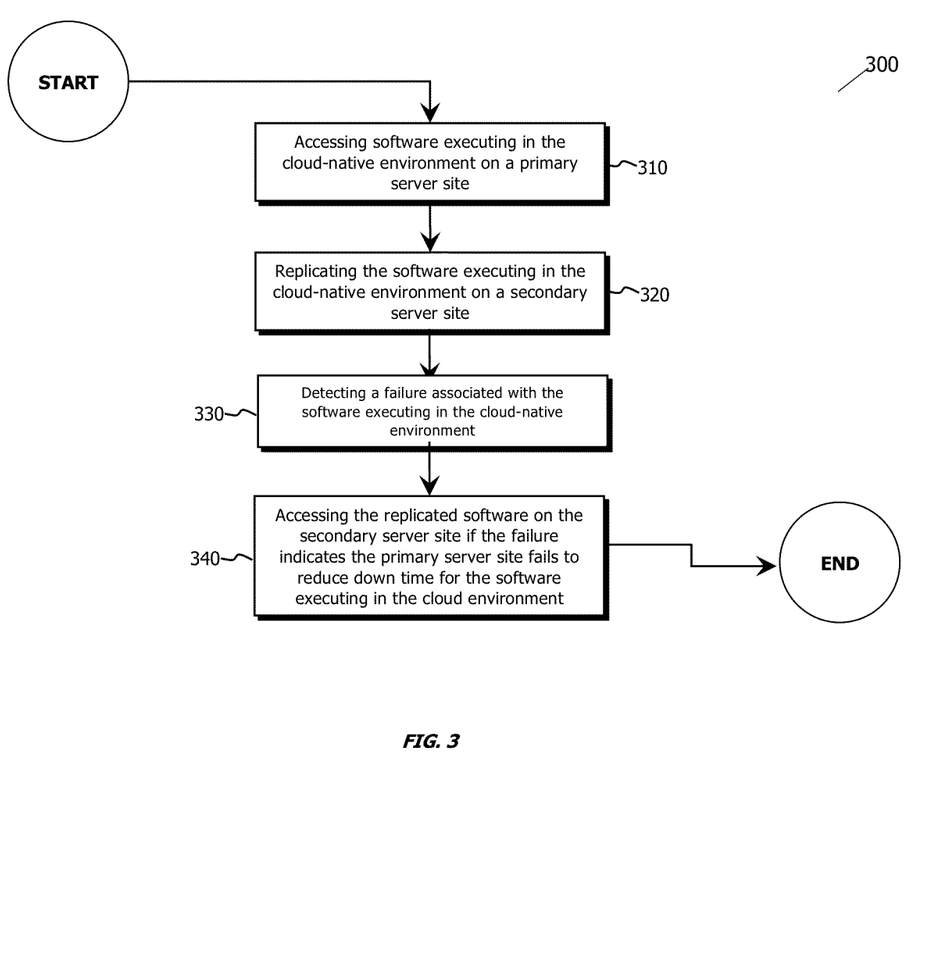
FIG. 3 illustrates a flowchart illustrating a process for quick disaster recovery according to at least one embodiment.

Referring now to FIG. 3, an operational flowchart illustrating an exemplary process 300 for reducing an amount of time for disaster recovery is depicted according to at least one embodiment.

At step 310 of the process 300, software that is executing in a cloud-native environment on a primary server site is accessed. To perform the step 310, the COP 120 is functioning in its operational capacity in a cloud-native environment embodied in network 110. One or more servers of and/or associated with container network environment 100 access COP 120 in order to monitor the health, status, and operations of primary site 140. It should be noted that the concept of distributing and protecting data across the plurality of clusters associated with master node 130 is known to those of ordinary skill in the art; however, the analysis of whether or not primary site 140 is operating efficiently may be determined via the one or more servers based on variances to the normal computing analytics and computing resources available which are consistently monitored within container network environment 100.

At step 320 of the process 300, the software executing in the cloud-native environment is replicated on a secondary site. The one or more servers generate a replication of one or more of pods 210-220 in which the replication can ensure High Availability for system up-time and can detect issues pertaining to data distribution. In some embodiments, one or more of pods 210-220 may be a configuration pod including a plurality of configuration data representing provisioning data, topology data, pod resource data, and any other applicable ascertainable data pertaining to one or more components of container network environment 100 and/or COP 120. The replication may be based on the plurality of configuration data to ensure that secondary site 150 includes an identical or significantly similar configuration as primary site 140.

At step 330 of the process 300, a failure associated with the software executing in the cloud-native environment is detected. The one or more servers detect a failure associated with COP 120 in which the failure may include but is not limited to a system failure, method failure, communication medium failure, secondary storage failure, security issues, reduced functioning of one or more components of environment 100, and/or any other applicable computing issue known to those of ordinary skill in the art. Detection of the failure via the one or more servers not only allows COP 120 to determine whether generation of secondary site 150 is necessary, but also prompts master node 130 to determine in real-time if adjustments to the configuration of primary site 140 is necessary prior to generation of secondary site 150. It should be noted that the primary purpose of detecting the failure is to reduce the recovery time objective and/or the recovery point objective of environment 100.

Figure 4:
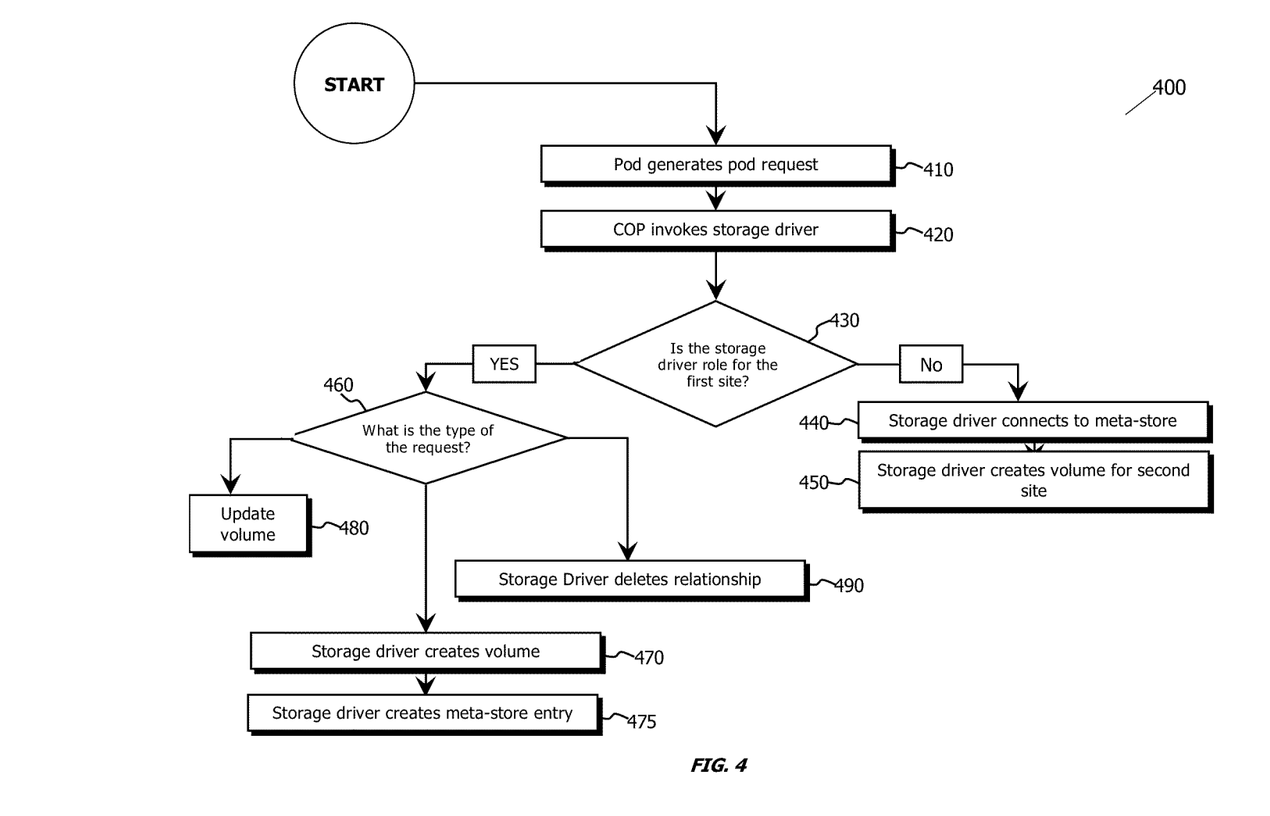
FIG. 4 illustrates a flowchart illustrating a process for site replication according to at least one embodiment.

At step 340 of the process 300, the replicated software is accessed on the secondary server site if the failure is causing down time for the software executing in the cloud environment. Based on the one or more servers detecting the failure, COP 120 accesses secondary site 150 and instructs the one or more servers to instruct storage driver 260b to perform one or more operations on secondary site 150. It should be noted that the process depicted in FIG. 4 is a detailed explanation of the one or more operations performed by storage drivers 260a & 260b. The mapping and retrieval of mappings and data derived thereof (e.g., locations) support COP 120 in ascertaining the necessity and amount of computing resources that are needed to reduce recovery time objective and/or the recovery point objective. In some embodiments, when the failure is detected, secondary site 150 becomes the target for replications of data derived from primary site 140 via one or more periodic snapshots. In some embodiments, COP 120 initiates the generation process of network topology 200 via taking one or more snapshots of SVO 250 and generating network topology 200 based on the one or more snapshots of SVO 250 and/or data derived from the one or more snapshots. Although data may be replicated and sent to secondary site 150, it is crucial that data of primary site 140 regarding specificity as to the demand for replicated storage along with location information pertaining to where to replicate is collected. In some embodiments, this data is ascertained from the cluster ID of the particular cluster.

Referring now to FIG. 4, an operational flowchart illustrating an exemplary process 400 for replication of secondary site 150 is depicted according to at least one embodiment.

At step 410 of process 400, one or more of pods 210-220 generates a pod request. In some embodiments, the pod request is a memory request, a resource request, pod-specific limits (e.g., how much CPU time the applicable pod requires), or any other applicable pod-specific demand and/or combination thereof. The pod request is generally specific to availability and accessibility to storage; however, the pod request may be the minimum amount of CPU or memory that is guaranteed to the requesting pod. In some embodiments, the pod request may specify the request for particular applications running within the requesting pod providing the ability to ascertain what resources the particular application needs. In this working example, the pod request is VR 230 configured to invoke scheduling of the applicable pod to mount SVO 250 which is provisioned by one or more of VR 230-240. For example, VR 230 may invoke one or more storage classes to be specified in order to enable COP 120 to know the particular storage driver 260 (in applicable configurations where there are multiple storage drivers) that is required to be invoked in which the parameters of storage class definitions are utilized. VR 230-240 may be requests to add volume or requests to update or delete volume. In some embodiments, the storage class is configured utilizing a storage class configuration object designed for use by each application running in pods 210-220. An example VR configuration is depicted in Table 1:

Table 1
apiVersion:
kind:
metadata:
name:
name:
spec:
accessModes:
-ReadWriteOnce:
storageClassName: replicated-storage-class-1
resources:
requests:
storage: 5Gi At 420 of process 400, COP 120 invokes one of storage drivers 260a or 260b. The configuration for the storage classes of storage driver 260 is specified by an administrator of COP 120 based on the applicable site. In some embodiments, the configuration for the storage classes may be associated with multiple instances of storage volume request mappings wherein each is associated with a different cluster id. Storage drivers 260a and/or 260b consistently listen for VRs which are designed to be accounted for when applicable code is deployed in COP 120. In application, when a failure on primary site 140 occurs, the one or more servers generate an indicator to trigger a devops process to deploy the code on secondary site 150.

At 430 of process 400, storage drivers 260a or 260b determines a role of the first pod request. It should be noted that the role of the pod request is directed towards what purpose storage driver 260a or 260b serves. For example, during the replication process, the role enables one of storage drivers 260a or 260b to determine its behavior in the creation of one or more of VR 230-240. For example, if the role is for primary site 140 then storage driver 260a must define one or more storage class configurations intended for replication specifying primary site 140 as the source. An example storage class configuration for replication based on the role being for primary site 140 is depicted in Table 2:

Table 2
apiVersion: storage.k8s.io/v1beta1
kind: StorageClass
metadata:
name: replicated-storage-class-
provisioner: my-vendor/my-driver-1
parameters:
replication-role: source
replication-type: MetroMirror
repl-group: my-consistency-group
replication-async: true
repl-target-site: us-south1
repl-metastore-addr: https://s3.cloud.ibm.com/d3455jiq/us-fra In another example, if the role is for secondary site 150 then storage driver 260b must define one or more storage class configurations intended for replication specifying secondary site 150 as the target. An example storage class configuration for replication based on the role being for secondary site 150 is depicted in Table 3:

Table 3
apiVersion: storage.k8s.io/v1beta1
kind: StorageClass
metadata:
name: replicated-storage-class-
provisioner: my-vendor/my-driver-1
parameters:
replication-role: target
replication-source-site: eu-frankfurt1
repl-source-cluster-id: c2e42kj20nkvk4h1atj0
repl-metastore-addr: https://s3.cloud.ibm.com/d3455jiq/us-fra If it is determined that the role is not intended for primary site 140 then step 440 of process 400 occurs in which storage driver 260b connects to replication meta-store 280. Storage driver 260b connecting to replication meta-store 280 with a role intended for secondary site 150 enables storage driver 260b to continuously detect VR 240-245 to determine if SVO 255 needs to be added, updated, or deleted. If one of VR 240-245 is a request for new SV then step 450 of process 400 occurs in which storage driver 260 returns SVO 255 which is an already existing SV; however, it should be noted that storage driver 260b does not generate SVO 250 which is within storage system 270 but rather returns SVO 255 which is derived from replication meta-store 280 based on the applicable cluster id of primary site 140. In some embodiments, storage driver 260b ascertains metadata from SVO 255 wherein metadata includes but is not limited to the mappings within replication meta-store 280 that corresponds to VR 230 and/or VR 235 and the applicable cluster-id associated with primary site 140, image files associated with pods 210-220, or any other applicable pod or cluster specific data. Mappings stored in replication meta-store 280 may be identified by storage driver 260b based on the applicable cluster id in instances where the mapping is to be retrieved by storage driver 260b.

In some embodiments, each mapping identifies at least a single one to one correspondence between two distinct storage volumes of plurality of storage volumes 275. For example, storage driver 206b identifies $SV_{1'}$. $SV_{1'}$ will be the corresponding volume because $SV_1$ is bounded to VR 230. Storage driver 260b completes the new volume request once storage driver 260b provides one of $SV_1$ or $SV_2$ or $SV_3$ rather than storage driver 260b creating an additional storage volume.

If storage driver 260a determines that the role is intended for primary site 140 then step 460 of process 400 occurs in which storage driver 260a must determine the type of request of the pod request. If the type of the pod request indicates that a storage volume needs to be created, then 470 occurs in which SV 275 are created on sites 140 & 150, relationships are respectively established between plurality of storage volumes 275 (e.g., $SV_1$ to $SV_{1'}$, $SV_2$ to $SV^{2'}$, $SV_3$ to $SV_{3'}$), and step 475 of process 400 occurs in which storage driver 260a creates an entry in replication meta-store 280 reflecting the mapping of applicable cluster id-VR-SVO-SV-SV'. In particular, storage driver 260b extracts mappings from pods 210-220 and storage system 270 in order to generate a full map of the cluster id of the application running on the applicable pod of primary site 140-VR-SV-SV-SV', wherein the map is configured to be stored in replication meta-store 280. In some embodiments, the entry includes the cluster-id of COP 120, VR 230-240, and plurality of storage volumes 275 all of which may be returned to COP 120.

If the type of the pod request is to update storage volumes, then 480 of process 400 occurs in which storage driver 260a ceases replication, if necessary, updates the applicable SV of plurality of storage volumes 275 on primary site 140, updates the applicable SV of plurality of storage volumes 275 on secondary site 150, re-establishes the replication relationships between plurality of storage volumes 275, and/or updates the entry into replication meta-store 280.

If type of the pod request indicates deleting volume, then step 490 of process 400 occurs in which storage driver 260a deletes the relationship, deletes plurality of storage volumes 275 ($SV_1$, $SV_{1'}$, $SV_2$, $SV_{2'}$, $SV_3$, $SV_{3'}$, and deletes the entry in replication meta-store 280.

Figure 5:
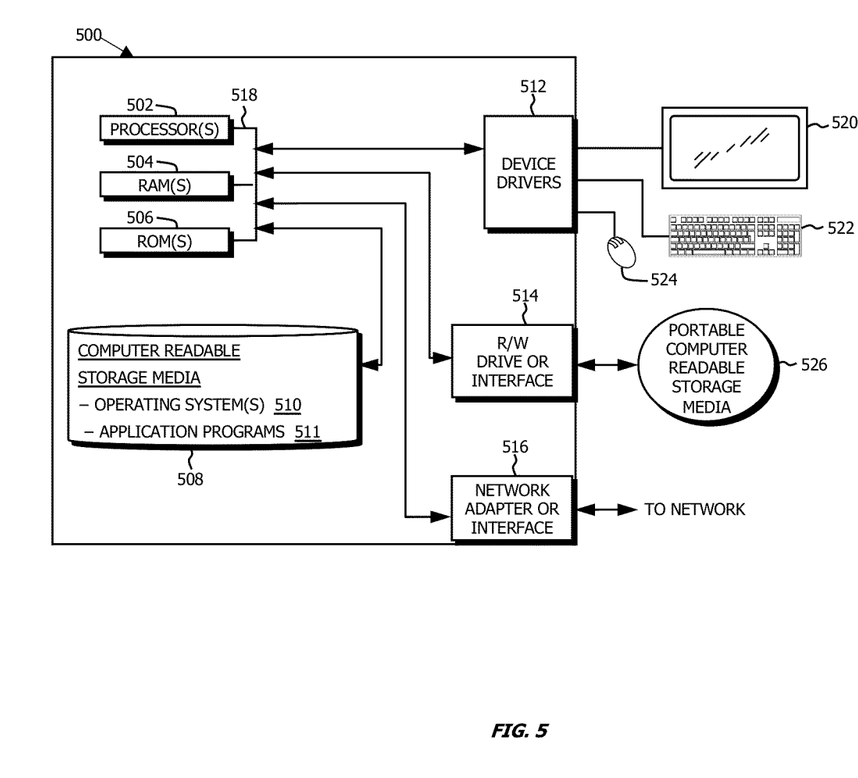
FIG. 5 depicts a block diagram illustrating components of the software application of FIG. 1, in accordance with an embodiment of the invention.

FIG. 5 is a block diagram of components 500 of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 500 is representative of any electronic device capable of executing machine-readable program instructions. Data processing system 500 may be representative of a smart phone, a computer system, PDA, or other electronic devices. Examples of computing systems, environments, and/or configurations that may represented by data processing system 500 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The one or more servers may include respective sets of components illustrated in FIG. 5. Each of the sets of components include one or more processors 502, one or more computer-readable RAMs 504 and one or more computer-readable ROMs 506 on one or more buses 518, and one or more operating systems 510 and one or more computer-readable tangible storage devices 508. The one or more operating systems 510 and COP 120 may be stored on one or more computer-readable tangible storage devices 508 for execution by one or more processors 502 via one or more RAMs 504 (which typically include cache memory). In the embodiment illustrated in FIG. 5, each of the computer-readable tangible storage devices 508 is a magnetic disk storage device of an internal hard drive. Alternatively, each of the computer-readable tangible storage devices 526 is a semiconductor storage device such as ROM 506, EPROM, flash memory or any other computer-readable tangible storage device that can store a computer program and digital information.

Each set of components 500 also includes a R/W drive or interface 514 to read from and write to one or more portable computer-readable tangible storage devices 508 such as a CD-ROM, DVD, memory stick, magnetic tape, magnetic disk, optical disk or semiconductor storage device. A software program, such as COP 120 can be stored on one or more of the respective portable computer-readable tangible storage devices 508, read via the respective R/W drive or interface 518 and loaded into the respective hard drive.

Each set of components 500 may also include network adapters (or switch port cards) or interfaces 516 such as a TCP/IP adapter cards, wireless wi-fi interface cards, or 3G or 4G wireless interface cards or other wired or wireless communication links. COP 120 can be downloaded from an external computer (e.g., server) via a network (for example, the Internet, a local area network or other, wide area network) and respective network adapters or interfaces 516. From the network adapters (or switch port adaptors) or interfaces 516, COP 120 is loaded into the respective hard drive 508. The network may comprise copper wires, optical fibers, wireless transmission, routers, firewalls, switches, gateway computers and/or edge servers.

Each of components 500 can include a computer display monitor 520, a keyboard 522, and a computer mouse 524. Components 500 can also include touch screens, virtual keyboards, touch pads, pointing devices, and other human interface devices. Each of the sets of components 500 also includes device processors 502 to interface to computer display monitor 520, keyboard 522 and computer mouse 524. The device drivers 512, R/W drive or interface 514 and network adapter or interface 516 comprise hardware and software (stored in storage device 526 and/or ROM 506).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
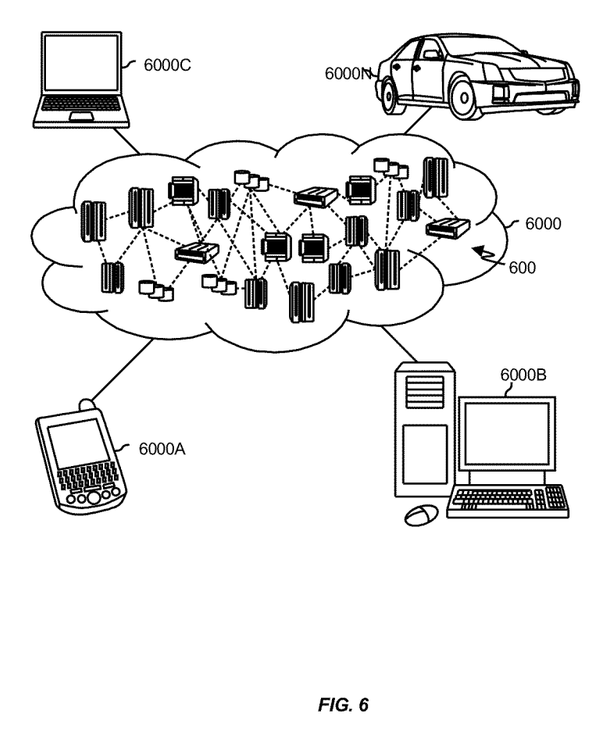
FIG. 6 depicts a cloud-computing environment, in accordance with an embodiment of the present invention.

Referring now to FIG. 6, illustrative cloud computing environment 600 is depicted. As shown, cloud computing environment 600 comprises one or more cloud computing nodes 6000 with which local computing devices used by cloud consumers, such as, for example, personal digital assistant (PDA) or cellular telephone 6000A, desktop computer 6000B, laptop computer 6000C, and/or automobile computer system 6000N may communicate. Nodes 6000 may communicate with one another. They may be grouped (not shown) physically or virtually, in one or more networks, such as Private, Community, Public, or Hybrid clouds as described hereinabove, or a combination thereof. This allows cloud computing environment 6000 to offer infrastructure, platforms and/or software as services for which a cloud consumer does not need to maintain resources on a local computing device. It is understood that the types of computing devices 6000A-N shown in FIG. 6 are intended to be illustrative only and that computing nodes 6000 and cloud computing environment 600 can communicate with any type of computerized device over any type of network and/or network addressable connection (e.g., using a web browser).

Figure 7:
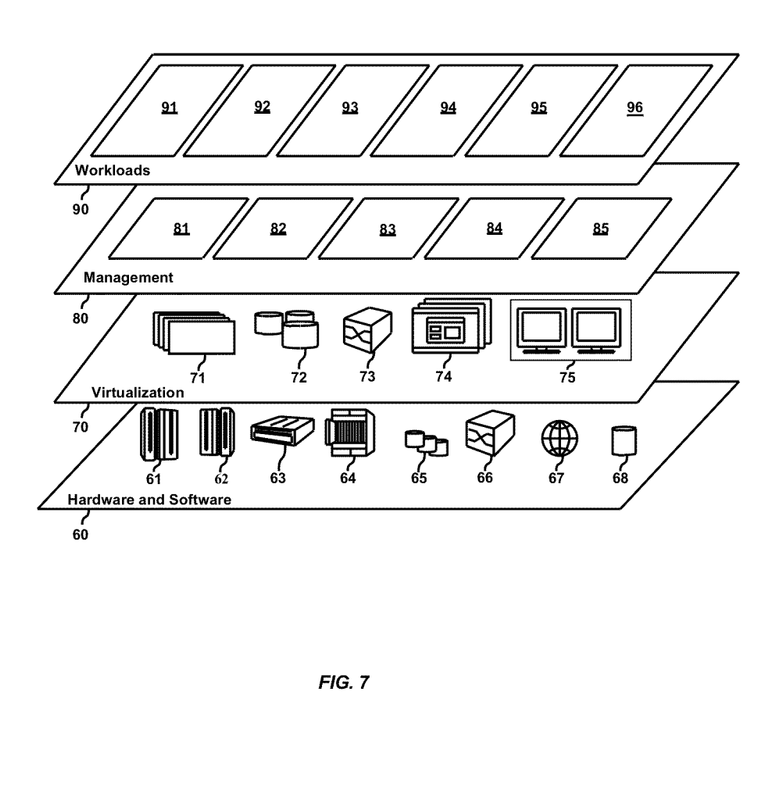
FIG. 7 depicts abstraction model layers, in accordance with an embodiment of the present invention.

Referring now to FIG. 7 a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95, and one or more features of container network environment 100.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for disaster recovery, comprising:
   replicating, via a computer, at a secondary server site, software executing in a cloud-native environment on a primary server site wherein replicating comprises generating, via the computer, a mapping of a first storage volume request of a primary storage volume object to a second storage volume request of a secondary storage volume object on the secondary server site based on a role;
   detecting, via the computer, a failure associated with the software executing in the cloud-native environment;
   determining, via the computer, whether the detected failure is causing down time for the software executing in the cloud-native environment; and
   in response to determining that the detected failure is causing down time, deploying, via the computer, the replicated software on the secondary server site.

2. The computer-implemented method according to claim 1, wherein replicating the software at the secondary server site comprises:
   receiving, via the computer, a first pod request of at least one primary pod associated with the primary server site; and
   determining, via the computer, the role of the first pod request.

3. The computer-implemented method according to claim 2, wherein replicating the software at the secondary server site further comprises:
   determining, via the computer, a cluster identifier associated with the first pod request;
   storing, via the computer, the mapping in a meta-store based on the cluster identifier; and
   assigning, via the computer, the cluster identifier to the first pod request to allow a secondary pod associated with the secondary server site to access the secondary storage volume object which is a replicated copy of the primary server site and corresponds to the primary pod.

4. The computer-implemented method according to claim 2, wherein replicating the software at the secondary server site further comprises:
   detecting, via the computer, a volume request;
   creating, via the computer, the secondary storage volume object associated with the secondary server site based on the volume request, wherein the secondary storage volume object corresponds to the primary storage volume object of the primary server site as a replicated copy; and
   establishing, via the computer, a replication relationship between the primary storage volume object and the secondary storage volume object.

5. The computer-implemented method according to claim 4, wherein detecting the volume request comprises:

modifying, via the computer, the replication relationship between the primary storage volume object and the second storage volume object based on the volume request; and updating, via the computer, one or more entries of a replication meta-store corresponding to the modified replication relationship;

if the modification request indicates a demand for additional storage, breaking, via the computer, the replication relationship between primary volume storage and secondary volume storage;

expanding, via the computer, the secondary volume storage to allocate additional storage as requested;

expanding, via the computer, the primary volume storage to allocate additional storage as requested;

recreating, via the computer, the replication relationship between primary volume storage and the secondary volume storage; and if the modification request indicates a demand for volume deletion, removing, via the computer, the secondary storage volume object, the primary storage volume object, and the replication relationship between them.

6. The computer-implemented method according to claim 5, wherein replicating the software at the secondary server site further comprises:

receiving, via the computer, a second pod request of at least one secondary pod associated with the secondary server site;

extracting, via the computer, replication meta-store based on the pod request; and identifying, via the computer, the secondary storage volume object based on the role of the second pod request; and associating, via the computer, the identified secondary storage volume object to the pod request.

7. The computer-implemented method according to claim 1, wherein the cloud-native environment is operated by a container orchestration platform.

8. A computer system for disaster recovery for software executing in a cloud-native environment, the computer system comprising:

one or more processors, one or more computer-readable memories, and program instructions stored on at least one of the one or more computer-readable memories for execution by at least one of the one or more processors to cause the computer system to:

replicate, at a secondary server site, software executing in the cloud-native environment on a primary server site, wherein replicating comprises program instructions to generate a mapping of a first storage volume request of a primary storage volume object to a second storage volume request of a secondary storage volume object on the secondary server site based on a role;

detect a failure associated with the software executing in the cloud-native environment;

determine whether the detected failure is causing down time for the software executing in the cloud-native environment; and in response to determining that the detected failure is causing down time, and in response deploy the replicated software on the secondary server site.

9. The computer system of claim 8, further comprising program instructions to:

receive a first pod request of at least one primary pod associated with the primary server site; and determine the role of the first pod request.

10. The computer system of claim 9, further comprising program instructions to:

determine a cluster identifier associated with the first pod request;

store the mapping in a meta-store based on the cluster identifier; and assign the cluster identifier to the first pod request to allow a secondary pod associated with the secondary server site to access the secondary storage volume object which is a replicated copy of the primary server site and corresponds to the primary pod.

11. The computer system of claim 9, wherein the program instructions to replicate the software at the secondary server site further comprise program instructions to:

detect a volume request;

create the secondary storage volume object associated with the secondary server site based on the volume request, wherein the secondary storage volume object corresponds to the primary storage volume object of the primary server site as a replicated copy; and establish a replication relationship between the primary storage volume object and the secondary storage volume object.

12. The computer system of claim 9, wherein the program instructions to detect the volume request further comprises program instructions to:

modify the replication relationship between the primary storage volume object and the second storage volume object based on the volume request;

update one or more entries of a replication meta-store corresponding to the modified replication relationship;

if the modification request indicates a demand for additional storage, break the replication relationship between primary volume storage and secondary volume storage;

expand the secondary volume storage to allocate additional storage as requested;

expand the primary volume storage to allocate additional storage as requested;

recreate the replication relationship between primary volume storage and the secondary volume storage; and if the modification request indicates a demand for volume deletion, remove the secondary storage volume object, the primary storage volume object, and the replication relationship between them.

13. The computer system of claim 8, wherein the cloud-native environment is operated by a container orchestration platform.

14. A computer program product using a computing device for disaster recovery for software executing in a cloud-native environment, the computer program product comprising:

one or more non-transitory computer-readable storage media and program instructions stored on the one or more non-transitory computer-readable storage media, the program instructions, when executed by the computing device, cause the computing device to perform a method comprising:

replicating at a secondary server site, software executing in a cloud-native environment on a primary server site wherein replicating comprises generating, via the computer, a mapping of a first storage volume request of a primary storage volume object to a second storage volume request of a secondary storage volume object on the secondary server site based on a role;

detecting a failure associated with the software executing in the cloud-native environment;

determining whether the detected failure is causing down time for the software executing in the cloud-native environment; and in response to determining that the detected failure is causing down time, deploying the replicated software on the secondary server site.

15. The computer program product of claim 14, wherein replicating at the secondary server site software further comprises:

receiving a first pod request of at least one primary pod associated with the primary server site; and determining the role of the first pod request.

16. The computer program product of claim 15, wherein replicating the software at the secondary server site further comprises:

determining a cluster identifier associated with the first pod request;

storing the mapping in a meta-store based on the cluster identifier; and assigning the cluster identifier to the first pod request to allow a secondary pod associated with the secondary server site to access the secondary storage volume object which is a replicated copy of the primary server site and corresponds to the primary pod.

17. The computer program product of claim 15, wherein replicating the software at the secondary server site further comprises:

detecting a volume request;

creating the secondary storage volume object associated with the secondary server site based on the volume request, wherein the secondary storage volume object corresponds to the primary storage volume object of the primary server site as a replicated copy; and establishing a replication relationship between the primary storage volume object and the secondary storage volume object.

18. The computer program product of claim 17, wherein detecting the volume request further comprises:

modifying the replication relationship between the primary storage volume object and the second storage volume object based on the volume request; and updating one or more entries of a replication meta-store corresponding to the modified replication relationship;

if the modification request indicates a demand for additional storage, breaking the replication relationship between primary volume storage and secondary volume storage;

expanding the secondary volume storage to allocate additional storage as requested;

expanding the primary volume storage to allocate additional storage as requested;

recreating the replication relationship between primary volume storage and the secondary volume storage;

if the modification request indicates a demand for volume deletion, removing the secondary storage volume object, the primary storage volume object, and the replication relationship between them.

19. The computer program product of claim 18, wherein replicating the software at the secondary server site further comprises:

receiving a second pod request of at least one secondary pod associated with the secondary server site;

extracting a role of the second pod request from the replication meta-store based on the pod request; and identifying the secondary storage volume object based on the role of the second pod request; and associating the identified secondary storage volume object to the pod request.

20. The computer program product of claim 14, wherein the cloud-native environment is operated by a container orchestration platform.

* * * * *